United States Patent [19]

Pawlykowych et al.

[11] Patent Number: 5,316,259
[45] Date of Patent: May 31, 1994

[54] CYCLE SEAT SUPPORT APPARATUS

[76] Inventors: Zenon Pawlykowych, 1892 N. Albert, Falcon Heights, Minn. 55113; Hy Rosenstein, 9600 Portland Ave. South, Bloomington, Minn. 55420

[21] Appl. No.: 747,186

[22] Filed: Aug. 19, 1991

Related U.S. Application Data

[63] Continuation-in-part of Ser. No. 531,029, May 31, 1990, abandoned.

[51] Int. Cl.⁵ .................................. F16M 13/00
[52] U.S. Cl. .................................. 248/601; 267/132; 267/169; 403/371
[58] Field of Search .................. 280/220, 288.4; 248/599, 600, 601, 622, 623; 297/209, 208, 211, 195; 267/131, 132, 169; 403/371, 365

[56] References Cited

U.S. PATENT DOCUMENTS

| | | | |
|---|---|---|---|
| 13,383 | 3/1812 | Harley | 248/600 X |
| 568,593 | 9/1896 | Watson | 297/209 |
| 591,840 | 10/1897 | Haker | 248/600 |
| 598,186 | 2/1898 | Thompson . | |
| 606,413 | 6/1898 | Holland | 297/209 |
| 626,396 | 6/1899 | Smith | 248/601 X |
| 636,726 | 11/1899 | Hindmarsh | 248/601 X |
| 640,483 | 1/1900 | McKenzie . | |
| 2,639,760 | 5/1953 | Szilagyi | 297/209 |
| 3,156,281 | 11/1964 | Demi | 403/371 X |
| 3,481,628 | 12/1969 | Brilando et al. | 297/209 |
| 3,891,236 | 6/1975 | Kuwano et al. | 267/132 X |
| 4,182,508 | 1/1980 | Kallai et al. . | |
| 4,245,826 | 1/1981 | Wirges | 267/137 |
| 4,287,785 | 9/1981 | Hunt | 403/371 X |
| 4,428,478 | 1/1984 | Hoffman | 206/315.9 |
| 4,455,010 | 6/1984 | Butler . | |
| 4,456,295 | 6/1984 | Francu . | |
| 4,502,653 | 3/1985 | Curtis, Jr. . | |
| 4,736,983 | 4/1988 | Furbee . | |
| 4,863,473 | 9/1989 | Glowczewskie, Jr. et al. | 248/188.5 X |

OTHER PUBLICATIONS

Knapp Engineering brochure entitled, "Hydra Post with Fluidguide," 2 pages (Exhibit).
Citysports article entitled, "Velo Pages News from the Bike Beat," dated Jan. 1990, 1 page. (Exhibit B).
The Condensed Chemical Dictionary, cover page and p. 919.

*Primary Examiner*—Ramon O. Ramirez
*Assistant Examiner*—Korie H. Chan
*Attorney, Agent, or Firm*—Merchant, Gould, Smith, Edell, Welter & Schmidt

[57] ABSTRACT

An apparatus is described for use in dampening impact loading transmitted between a cycle frame and a cycle seat. The cycle seat support apparatus has: an elongated sleeve attachable at one end to the cycle frame and having an opening extending into the sleeve at the opposite end; an elongated post attachable to the cycle seat at one end and the opposite end being slidably positioned in the opening of the sleeve; and structure for biasing the post to urge the post toward an at rest position when the post is moved relative to the sleeve. The opening in the sleeve has an inner surface and the post has an outer surface which are in sliding engagement during relative sliding movement of the post and the sleeve. The outer surface of the post and the inner surface of the sleeve being made of compatible plastics exhibiting sufficient lubricity to permit sliding movement of the post relative to the sleeve thereby minimizing wear of the inner surface of the sleeve and the outer surface of the post.

7 Claims, 3 Drawing Sheets

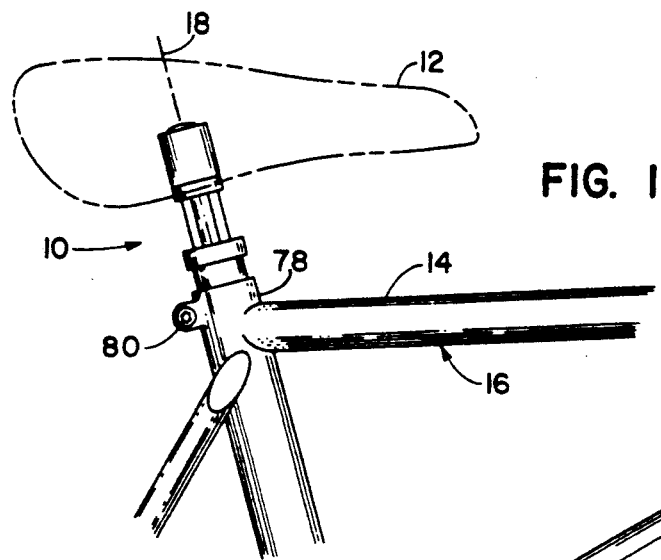
FIG. 1
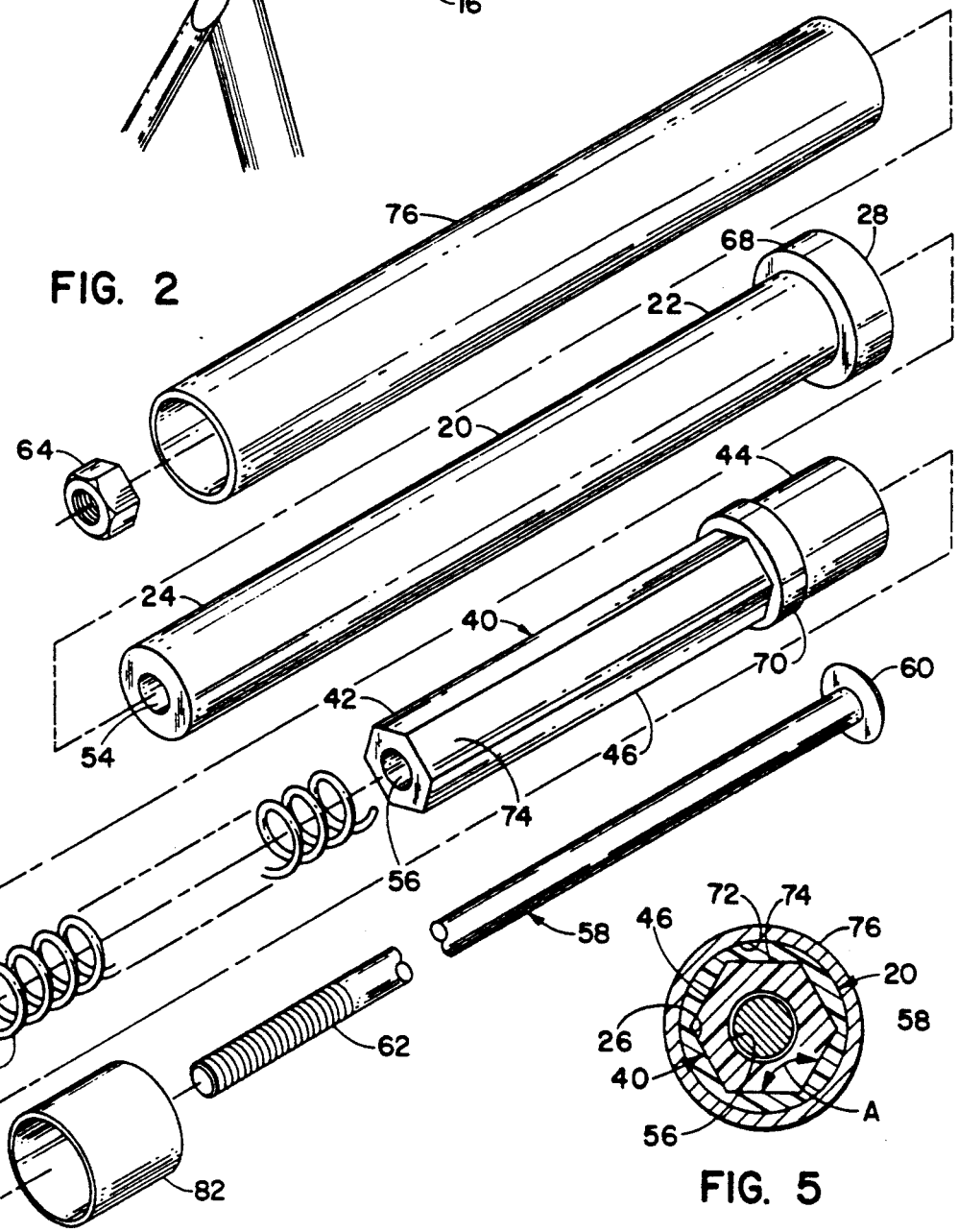
FIG. 2
FIG. 5

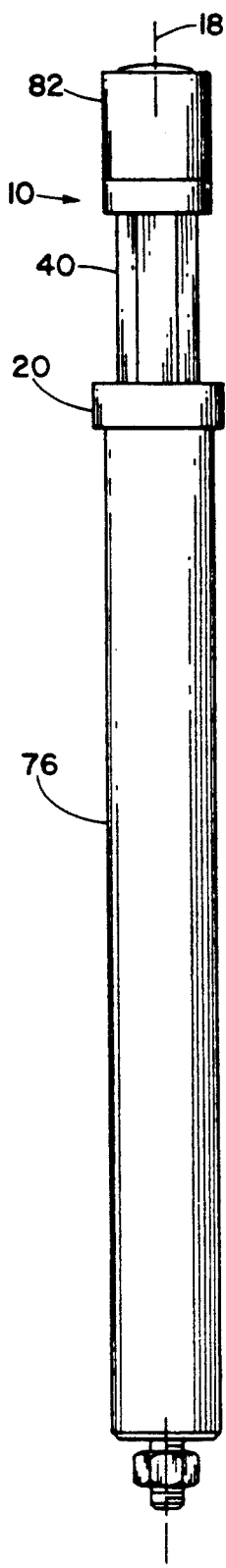
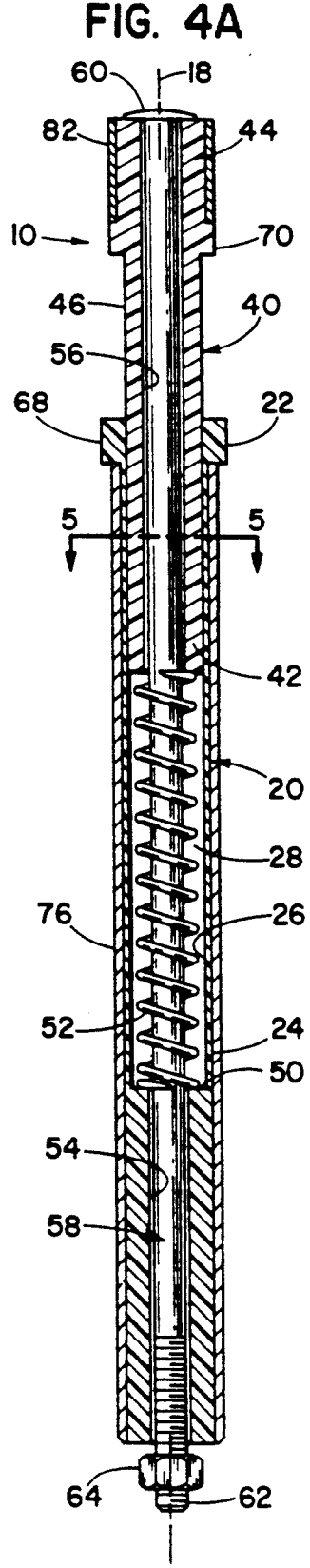
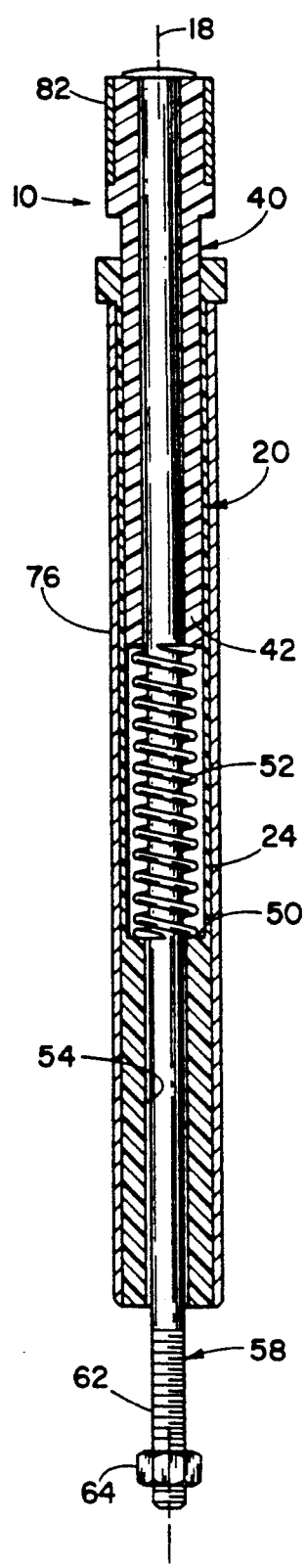

CYCLE SEAT SUPPORT APPARATUS

RELATED APPLICATIONS

This application is a continuation-in-part of U.S. patent application Ser. No. 07/531,029, filed May 31, 1990 now abandoned.

FIELD OF THE INVENTION

This invention relates to a cycle seat support apparatus for dampening impact loading transmitted between a cycle frame and a cycle seat as the cycle is subjected to impact loading during operation.

BACKGROUND OF THE INVENTION

A cycle or other similar vehicle driven or used by a rider generally has a frame which has at least one surface engaging member. Typically the surface engaging member comprises one or more wheels. Attached to the cycle frame is a seat for supporting the rider on the cycle during operation. In most instances, a rigid seat post or seat support apparatus is used to connect or attach the seat to the frame. In those apparatus, any impact loading applied to the cycle frame is transmitted directly through the rigid seat support apparatus to the seat. If the rider is supported by the seat, the impact loading often results in discomfort for the rider.

As an alternative, some seat support apparatus have been employed that have special features designed to dampen the impact loading and absorb the shock transmitted between the cycle frame and the cycle seat. Impact dampening seat support apparatus attempt to reduce the impact transmitted from the cycle frame to the cycle seat and rider to improve comfort to the rider when the cycle is subjected to the impact loading during operation.

In some previous impact dampening seat support apparatus, the seat support apparatus have metal parts which move relative to each other during impact loading. After movement, the parts are biased back toward an at rest position by biasing structure included on the seat support apparatus. One problem encountered with some seat support apparatus of this type is that some of the parts slidably engage each other during impact loading and subsequent biasing. The metal parts that slidably engage require external lubrication to prevent excessive wearing and grinding of the parts against each other. This results in lubricated parts being exposed to contact by the rider and also requires periodic lubrication by the rider. Furthermore, if the sliding parts are made from certain metals, they may rust or corrode, further diminishing the sliding capability of the parts. Wearing and grinding of the sliding parts of the cycle seat support apparatus is especially serious when the sliding surfaces are at angles relative to any loading transmitted through the cycle seat support apparatus.

Another problem sometimes encountered with conventional impact dampening cycle seat support apparatus having sliding or moving parts is caused by the necessity for structure in the apparatus for preventing rotational movement of the seat relative to the frame. Elongated structures having round cross-sectional shapes which slidably engage each other will rotate relative to each other unless structure is provided to limit rotation. To address this problem, one cycle seat support apparatus described in U.S. Pat. No. 4,736,983 employs an additional key member attached to an inner surface of a sleeve where the key member projects inwardly toward a post to engage a notch in the post to prevent rotational movement of the post relative to the sleeve. Another type of apparatus which also has an outer sleeve and an inner post is described in U.S. Pat. No. 4,182,508 and employs a single tooth projecting outwardly from the post which slides within an elongated slot formed in the sleeve. These structures are sometimes difficult to manufacture; cause a loss of stability; and prevent the sliding parts from securably engaging one another during operation.

Another problem encountered with conventional impact dampening apparatus is that some employ numerous small parts to limit rotation and/or dampen the impact loading. U.S. Pat. No. 4,456,295 discloses an impact dampening apparatus with five coil springs positioned inside and outside a box-like housing and several bolts with nuts inserted through the housing. Other apparatus employ intricate and costly structure such as hydraulics to dampen the impact loading and bias the moving parts to the at rest position.

Various other problems encountered with some impact dampening cycle seat support apparatus include that the apparatus is often bulky and may take up excessive space between the cycle frame and the cycle seat. Furthermore, some cycle seat support apparatus may add excessive weight to the cycle.

It is clear that there has been a continuing need for improvements in cycle seat support apparatus to provide for impact dampening for loads transmitted between a cycle frame and a cycle seat while addressing the above recited problems, or similar problems.

SUMMARY OF THE INVENTION

According to the principles of the present invention, an apparatus is provided for use in dampening impact loading transmitted between a cycle frame and a cycle seat. The cycle seat support apparatus has an elongated sleeve which has a first end, a second end, and an inner surface made of plastic extending from the first end towards the second end. The plastic exhibits sufficient lubricity to permit sliding engagement of the inner surface of the sleeve with another compatible plastic surface to minimize wear of the inner surface during sliding engagement. The second end of the sleeve is attachable to the cycle frame. The cycle seat support apparatus further has an elongated post which has a first end, a second end, and an outer surface extending from the first end toward the second end. The outer surface of the post is made of a plastic compatible with the inner surface of the sleeve. The first end of the post is slidable within the first end of the sleeve by sliding engagement of the outer surface of the post and the inner surface of the sleeve. The outer surface of the post and the inner surface of the sleeve are of sufficient length to provide securable engagement of the post and the sleeve. The second end of the post being attachable to the cycle seat. The post and the sleeve each include structure for limiting rotational movement of the post with respect to the sleeve. The cycle seat support apparatus further includes structure for biasing the post to urge the post toward an at rest position when the post is moved relative to the sleeve.

In another preferred embodiment, a cycle seat support apparatus is provided for dampening impact loading which includes an elongated sleeve which is insertable into a cycle frame tubular member. The elongated sleeve has a first end with an opening extending axially into the sleeve. The inner surface of the opening has a first plurality of substantially flat surfaces interconnected along their edges along the circumference of the opening and extending through the length of the opening a sufficient distance to provide for securable engagement of an elongated post. The angle between adjacent flat surfaces being less than 180°. The sleeve further having a second end opposite the first end and the sleeve further having a stop mounted in the opening of the sleeve toward the second end of the sleeve. The cycle seat support apparatus further includes an elongated post having an outside diameter less than the inside diameter of the cycle frame tubular member such that the post is insertable into the tubular member. The elongated post has a first end with an outer surface having a second plurality of substantially flat surfaces interconnected along their edges around the circumference of the outer surface. The substantially flat surfaces are configured to cooperatively engage the substantially flat surfaces along the elongated sleeve. The outer surface of the post extends along the length of the post to securably engage the sleeve so that the first end of the post is slidable within the opening of the sleeve with the substantially flat surfaces of the post and the substantially flat surfaces of the opening of the sleeve cooperating to limit rotational movement of the post with respect to the sleeve. The cycle seat support apparatus further includes a spring positioned in the opening of the sleeve between the first end of the post and the stop of the sleeve. The spring urges the post toward an at rest position when the post is moved relative to the sleeve. Preferably, the post and sleeve have substantially hexagonal shapes.

Various plastics are anticipated for use on the inner surface of the sleeve and the outer surface of the post. Valox ® 325 polyester resin, Delrin, Teflon, and Nylatron ® GS 50-60 nylon resin are some plastics that may be used, with the Nylatron ® GS 50-60 nylon resin being a preferred material.

BRIEF DESCRIPTION OF THE DRAWINGS

In the drawings, wherein like reference numerals generally indicate corresponding parts throughout the several views, FIG. 1 is a view of a first preferred embodiment of the cycle seat support apparatus according to the present invention secured to a tubular member of a cycle frame on one end and a cycle seat on the opposite end;

FIG. 2 is an exploded perspective view of the cycle seat support apparatus shown in FIG. 1;

FIG. 3 is a assembled side view of the cycle seat support apparatus shown in FIG. 2;

FIG. 4A is a longitudinal cross-sectional view of the cycle seat support apparatus shown in FIG. 3 showing the apparatus in the at rest position;

FIG. 4B is a longitudinal cross-sectional view of the cycle seat support apparatus shown in FIG. 3 showing the apparatus in the compressed position;

FIG. 5 is a cross-sectional view of the cycle seat support apparatus shown in FIG. 2 taken along lines 5—5.

DETAILED DESCRIPTION OF THE PREFERRED EMBODIMENTS

Figure 6:
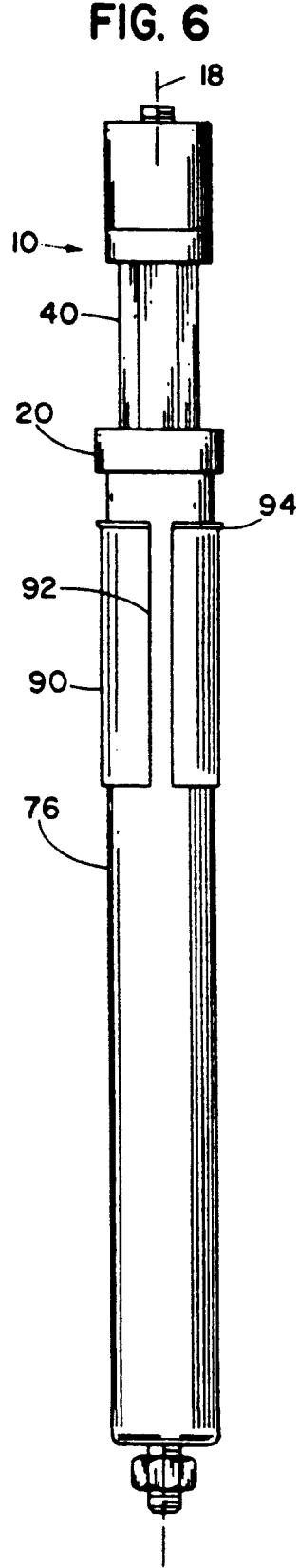
FIG. 6 is an assembled side view of the cycle seat support apparatus shown in FIG. 2, showing a shim operatively positioned on the tube.

Referring now to FIG. 1, a first preferred embodiment of a cycle seat support apparatus 10 is shown positioned between a cycle seat 12 and a cycle frame 14 of a cycle 16. Cycle seat support apparatus 10 is used to dampen impact loading transmitted between cycle frame 14 and cycle seat 12. While FIG. 1 shows only a portion of a cycle frame 14 of a cycle 16, one type of cycle for which the cycle seat support apparatus of the present invention may be used is a bicycle having two road engaging wheels (not shown).

The cycle seat support apparatus 10 shown has a generally elongated shape with one end of the cycle seat support apparatus being attached to cycle seat 12 and the opposite end being attached to cycle frame 14. During operation, impact loading causes one end of cycle seat support apparatus 10 to move axially along a longitudinal axis 18 of the apparatus relative to the opposite end to permit relative movement of the cycle seat and the cycle frame. As will be discussed below, structure is provided within the apparatus for dampening the relative movement of cycle seat 12 and cycle frame 14. While cycle seat support apparatus 10 permits relative axial movement of the ends, the cycle seat support apparatus also has structure which limits rotational movement about the longitudinal axis 18 of cycle seat 12 with respect to cycle frame 14.

In FIG. 2, cycle seat support apparatus 10 is shown in an exploded perspective view. Cycle seat support apparatus 10 is comprised of an elongated sleeve 20 that has a first end 22 with an opening 28 sized to receive a first end 42 of an elongated post 40. A second end 24 of the sleeve 20 is attachable to cycle frame 14 and a second end 44 of post 40 is attachable to cycle seat 12. During impact loading, a load is applied to cycle seat support apparatus 10 causing post 40 to slidably move with respect to sleeve 20.

FIG. 3 illustrates the assembled view of the cycle seat support apparatus 10 shown in FIG. 2 and shows the relative positioning of post 40 and sleeve 20. The cross-sectional views shown in FIGS. 4A and 4B of the assembled cycle seat support apparatus 10 illustrate the cycle seat support apparatus in two different positions; an at rest position showing the apparatus under no impact loading (FIG. 4A), and the compressed position or impact loaded position (FIG. 4B).

As is best shown in the cross-sectional views of assembled cycle seat support apparatus 10 shown in FIGS. 4A and 4B, sleeve 20 has an inner surface 26 extending from the first end 22 of the sleeve toward the second end 24 o the sleeve and the post 40 has an outer surface 46 extending from first end 42 of post 40 toward the second end 44 of post 40. Both inner surface 26 and outer surface 46 are generally parallel to the longitudinal axis 18 of cycle seat support apparatus 10. During sliding movement of post 40 and sleeve 20, inner surface 26 of the sleeve is in sliding engagement with outer surface 46 of the post. The inner surface 26 of sleeve 20 and outer surface 46 of post 40 are of sufficient length such that the surfaces provide securable engagement of the post and the sleeve during operation.

The cycle seat support apparatus 10 includes biasing structure for urging post 40 to the at rest position shown in FIG. 4A after an impact loading places the apparatus in the compressed position as shown in FIG. 4B. Mounted within sleeve 20 is a stop 50 positioned adjacent second end 24 of sleeve 20 as is shown in FIGS. 4A and 4B. As also shown in FIGS. 4A and 4B, a spring 52 is mounted in sleeve 20 between stop 50 and first end 42 of post 40. The spring 20 shown is a helical coil spring and is typically made from metal although other suitable compressible materials can be used. During impact loading, first end 42 of post 40 moves relative to sleeve 20 in a direction further into opening 28 of sleeve 20 which causes spring 52 to be compressed between stop 50 and first end 42 of post 40. When the cycle seat support apparatus 10 is in the compressed position as shown in FIG. 4B, spring 52 acts to bias or urge post 40 and sleeve 20 back toward the at rest position. The result of biased relative movement of post 40 and sleeve 20 is to dampen impact loading transmitted axially through cycle seat support apparatus 10.

As is best shown in FIGS. 4A and 4B, stop 50 of sleeve 20 has an axial bore 54 extending from one end of the stop to the other. The post 40 has a similarly sized axial bore 56 extending from first end 42 of post 40 to the second end 44 of post. A rod 58 having a head 60 on one end and threads 62 on the other is inserted axially through the axial bore in cycle seat support apparatus 10. A nut 64 is threaded onto rod 58. Rod 58 and nut 64 cooperate to maintain sleeve 20 and post 40 as a single unit when mounted to cycle frame 14.

In a more preferred embodiment, nut 64 is positioned on rod 58 such that post 40 can move slightly axially away from sleeve 20 when cycle seat support apparatus 10 is in the at rest position. This prevents post 40 from abruptly stopping once spring 52 has biased post 40 back to the at rest position after impact loading. Preferably, nut 64 is a lock nut such that vibrations during operation will not cause nut 64 to move relative to rod 58.

The second end 44 of post 40 is provided with a circumferentially surrounding post flange 70 adjacent the second end 44 of post 40. The post flange 70 has an outer diameter larger than an inner diameter of the sleeve 20. The post flange 70 acts as a stop to prevent insertion of post 40 too far into sleeve 20. Preferably, post flange 70 is positioned to prevent spring 52 from bottoming out during insertion of post 40 into sleeve 20.

The inner surface 26 of sleeve 20 and the outer surface 46 of post 40 are preferably made from a plastic material exhibiting sufficient lubricity to permit sliding movement of sleeve 20 and post 40 during sliding engagement of the inner surface 26 of the sleeve 20 with the outer surface 46 of post 40. It is appreciated that plastic material exhibiting sufficient lubricity eliminates the need for external lubrication of the slidably engaging inner surface 26 and outer surface 46 and minimizes wearing and grinding of the inner surface 26 of sleeve 20 and the outer surface 46 of post 40. As used herein, the term "plastic" refers to high molecular weight polymers that can be shaped into objects and sustain high loads and stresses and may include appropriate polyethylenes, polypropelenes, polybutanes and other synthetic resins or the like. "Plastics" also refers to nylons such as nylon 6, nylon 6/6, nylon 6/12 and combinations thereof, also including additives for such purposes as strengthening and/or providing additional lubricity. It will be further understood by one of skill in the art that preferred plastics are thermoplastic in nature. Plastic materials used in the present invention can be formed from cured thermoplastic resins if desired with the addition of appropriate additives or adjuvants as filters, colorants, and plasticizers. It should be appreciated that the plastic material comprising the inner surface 26 of sleeve 20 and the plastic material comprising the outer surface 46 of post 40 need not be the same material but must only be compatible plastics exhibiting the above described properties. Because the surfaces 26, 46 are plastic, they will not rust or corrode.

The inner surface 26 of sleeve 20 and the outer surface 46 of post 40 may be made from compatible thermoplastic polyester resins. Both the inner surface of the sleeve and the outer surface of the post may be made from Valox ® 325 resin, an unreinforced thermoplastic polyester resin, produced by the General Electric Company. In addition to having lubricous properties, Valox ® 325 resin also has other desirable properties such as dimensional/physical stability in moist environments and chemical resistance to most oils and greases which further make Valox ® 325 resin one appropriate material for the moving parts of the cycle seat support apparatus 10 which are in sliding engagement. In some cases, an external lubricant may be desirable to facilitate proper operation during sliding movement. Other plastics, such as Delrin or Teflon, or combinations thereof, may be used instead. Again, external lubrication, such as oil, may be necessary to facilitate proper operation.

A preferred plastic is one including nylon. For example, one such plastic is Nylatron ® GS 50-60 nylon resin, from The Polymer Corporation, Reading, Pa. Nylatron ® GS 50-60 nylon resin is believed to contain approximately equal parts of nylon 6 and nylon 6/6, with a small amount, about 2%, of molybdenum disulfide ($MoS_2$). This material can be injection molded to form the post and the sleeve. Testing indicates that sufficient lubricity in the Nylatron ® GS 50-60 nylon resin is provided such that no external lubricant needs to be added between the sliding surfaces.

Sleeve 20 and post 40 can be made entirely of plastic. Various manufacturing processes are anticipated for manufacturing sleeve 20 and post 40 from appropriate plastics including injection molding, machining, and extrusion. It is anticipated that the plastic can be injected into separate molds to form the sleeve and the post or the resin material can be machined to the proper shapes if desired.

Any load transmitted through cycle seat support apparatus 10 during impact loading that has a component transverse to the longitudinal axis 18 of the apparatus will also be transverse to the inner surface 26 of sleeve 20 and the outer surface 46 of post 40. The transverse component will force the surfaces into tighter engagement. During sliding engagement of the inner surface 26 of the sleeve and the outer surface 46 of post 40, the transverse loading will cause an increase in the frictional forces acting on the surfaces. As shown in FIG. 1, cycle seat support apparatus 10 is maintained at an angle with respect to the vertical. By positioning the apparatus at an angle relative to the vertical, impact loading transmitted through the apparatus transverse to the longitudinal axis is greater than if the apparatus were vertically positioned. If the sleeve and the post were made from metal, as was done in some conventional seat support apparatus, the increased frictional forces required additional lubrication to prevent excessive wearing and grinding of the surfaces in sliding engagement. In many bicycles which the cycle seat support apparatus of the present invention may be used, the cycle seat support apparatus is positioned at an angle relative to the vertical. The plastic material comprising the inner surface of the post and the outer surface of the post in the present invention exhibits sufficient lubricity to permit sliding engagement of the surfaces when the apparatus is positioned at an angle. The Nylatron ® GS 50-60 resin and the Valox ® 325 resin when used as described above are two materials that function properly when the apparatus is maintained at an angle like that illustrated in FIG. 1.

The cycle seat support apparatus 10 of the present invention further includes structure for limiting rotational movement of sleeve 20 with respect to post 40 about the longitudinal axis 18 of the apparatus. As best shown in the cross-sectional view of FIG. 5, the inner surface 26 of sleeve 20 and the outer surface 46 of post 40 have non-circular cross-sectional shapes. As shown in FIG. 5, post 40 has a maximum diameter which is greater than a minimum diameter of opening 28 of the sleeve 20. During operation, the maximum diameter of post 40 and the minimum diameter of sleeve 20 cooperate to limit rotational movement of post 40 relative to sleeve 20.

More preferably, the outer surface 46 of post 40 and the inner surface 26 of sleeve 20 have at least one substantially flat surface portion 74, 72, respectively, wherein each flat surface portion 72 on sleeve 20 is adjacent to or opposes the flat surface portion 74 on the post 40. The opposing flat portions cooperate to limit rotational movement. In the more preferred embodiment, more than one flat portion is present on the post and on the sleeve, as is shown in FIG. 5. Angle A between adjacent flat surface portions on the sleeve 20 is preferably less than 180°. A post 40 without internal grooves or notches and a sleeve 20 without a matching projecting tooth or key member, as would occur if the adjacent flat surfaces on sleeve 20 were less than 180° apart, is easier to manufacture and results in post 40 and the sleeve 20 providing more stability to the rider. It is to be appreciated that post 40 and sleeve 20 could have any number of flat surface portions forming the circumference of each wherein the flat surface portions are interconnected along their edges around the circumference of the opening and the post, respectively.

More preferably, post 40 and the opening 28 of sleeve 20 have substantially hexagonal shapes as is best shown in FIG. 5. To prevent binding of sleeve 20 and post 40 during sliding movement, the intersections between adjacent flat surface portions on post 40 are slightly rounded. As mentioned previously, post 40 and sleeve 20 can be one-piece units. If formed into hexagonal cross sectional shapes, post 40 and sleeve 20 include integral structure to limit rotation. Unlike some conventional apparatus, no extra parts are required nor are any special shapes other than flat surfaces required to be formed.

Cycle seat support apparatus 10 is mounted to cycle frame 14 by securably mounting second end 24 of sleeve 20 axially in a tube 76, as is shown in FIG. 2 and FIG. 3. An epoxy or other compatible bonding agent can be used to mount sleeve 20 to tube 76. A sleeve flange 68 on sleeve 20 has an outside diameter larger than an inside diameter of tube 76 and engages the end of the tube to prevent axial movement of sleeve 20 relative to tube 76. Second end 24 of sleeve 20 with surrounding tube 76 is inserted axially into a tubular member 78 on cycle frame 14. Tubular member 78 of cycle frame 14 has an inside diameter slightly larger than an outside diameter of tube 76. Sleeve flange 68 has an outside diameter larger than the inside diameter of the tubular member 78 to prevent sleeve 20 and tube 76 from dropping into tubular member 78 below the top rim of the tubular member. A clamp arrangement 80, as shown in FIG. 1, causes the outer surface of tube 76 of the cycle seat support apparatus 10 to engage the inner surface of the tubular member 78 of the cycle frame 14 to prevent longitudinal and rotational movement of tube 76 and sleeve 20 with respect to cycle frame 14. Tube 76 is preferably made from metal or other substantially rigid material which permits securable attachment of tube 76 to the tubular member 78 of the cycle frame 14.

Preferably, the second end 44 of post 40 has a protective cover 82 securably mounted to post 40. Cycle seat 12 attaches directly to protective cover 82 which protects the plastic post from damage by the seat. Like tube 76, cover 82 is preferably made from metal or other rigid material and can be attached to post 40 with epoxy or other suitable bonding material.

As shown in FIG. 1, first end 42 of post 40 has an outer diameter which permits sleeve 20 and post 40 to be insertable into tubular member 78 during operation. Because a substantial portion of cycle seat support apparatus 10 can be inserted into tubular member 78 of cycle frame 14, the cycle seat support apparatus does not take up excessive space between cycle frame 14 and cycle seat 12. Further, the present invention takes advantage of pre-existing empty space within tubular member 78 and the portion of the cycle seat support apparatus 10 extending above tubular member 78 is substantially the same size as some conventional rigid seat support apparatus.

Once sleeve 20 of cycle seat support apparatus 10 is mounted to the cycle frame 14 such that the cycle seat 12 is at the proper height, the cycle seat support apparatus can be employed to dampen impact loading transmitted between the cycle frame and the seat. During impact loading, cycle seat 12 and cycle frame 14 move toward each other thereby causing insertion of first end 42 of post 40 further into the opening 28 of sleeve 20. When the cycle seat support apparatus is in the compressed position as shown in FIG. 4B, the spring operates to bias or urge the post toward the at rest position shown in FIG. 4A. The result is to dampen impact loading transmitted by the cycle frame 14 through the cycle seat support apparatus 10 to the seat 12, producing a more comfortable ride.

The cycle seat support apparatus 10 of the present invention is quite versatile. The cycle seat support apparatus 10 can be employed in various other vehicles besides bicycles to dampen impact loading transmitted to the rider. Furthermore, cycle seat support apparatus 10 is easily adaptable to various cycles 16 with cycle frames 14 having tubular members 78 with different sized diameters for receiving cycle seat support apparatus 10. As shown in FIG. 6, by providing a collar-like shim 90 around tube 76, the outer diameter of the tube of the cycle seat support apparatus can be increased to fit larger sized tubular members. Shim 90 is arcuate in shape and preferably extends substantially around the circumference of tube 76. A slot 92 extends from the top to the bottom of shim 90. A radially outwardly extending flange 94 is provided to prevent the shim from possibly falling down into the cycle frame. Preferably, shim 90 is made from metal and resiliently grips the tube 76 snuggly due to its arcuate shape. Additional shims can be added to surround shim 90 to provide an even greater outside diameter to the apparatus 10. A kit can be provided wherein several different shims are provided, each with a different thickness. By combining the shims in different combinations, even more variations for providing particular dimensions for the apparatus 10 are possible. For example, shim wall thicknesses may be provided for four different shims of: (1) 0.007 inches, (2) 0.015 inches, (3) 0.032 inches, and (4) 0.062 inches. By adding a single shim in some cases, or an appropriate combination of shims in other cases, more secure attachment of apparatus 10 to cycle frame 14 is possible for a variety of different diameters of tubular members 78. In addition, in order to compensate for riders of different weights, springs having different spring characteristics can be substituted for the spring shown to adapt the cycle seat support apparatus to the particular weight of the rider. These too can be provided in a kit to the operator of the cycle.

With respect to spring 52, care must be taken that the spring biasing properties of the spring 52 are not adversely affected during operation. Post flange 70 helps protect spring 52 by limiting the amount of insertion of post 40, and the resulting amount of compression of spring 52. By limiting compression of spring 52 beyond a point to permanently deform the spring 52, a longer lasting apparatus is provided.

Figure 7:
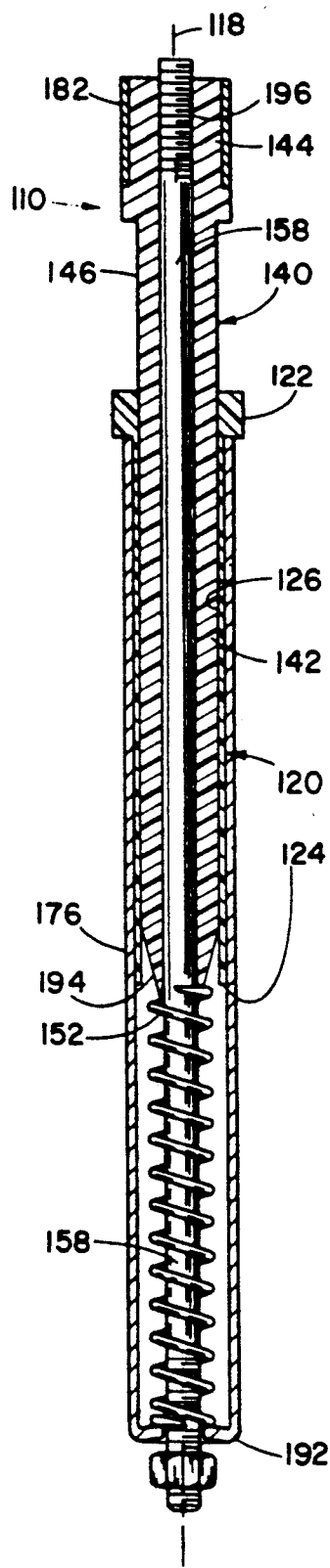
FIG. 7 is a longitudinal cross-sectional view of a second preferred embodiment of the cycle seat support apparatus.
Figure 8:
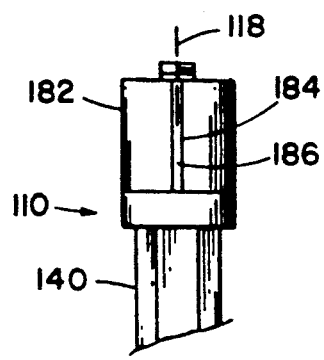
FIG. 8 is a view of the apparatus shown in FIG. 7, showing only the top portion.

FIGS. 7 and 8 illustrate a second preferred embodiment of a cycle seat support apparatus 110. Apparatus 110 includes a sleeve 120 with an inner surface 126 and a first end or top end 122 and a second end or bottom end 124. Post 140 includes a first end 142, second end 144, and an outer surface 146.

Several differences are noted between cycle seat support apparatus 10 shown in FIGS. 1-6 and cycle seat support apparatus 110 shown in FIGS. 7 and 8. One difference is that rod 158 is molded into post 140. Threads 196 may be provided to assist in attaching rod 158 to post 140.

Another difference noted with respect to cycle seat support apparatus 110 is that sleeve 120 does not extend continuously down from the top to form a stop for the spring. Instead, sleeve 120 extends downward from the top and terminates at approximately a point where the topmost portion of the spring 152 is positioned when the apparatus is at an at rest position. This structure is advantageous in that a larger diameter spring 152 may be used since a portion of the sleeve is not disposed between spring 152 and metal tube 176 taking up space as in the case of apparatus 10.

As shown in FIG. 7, instead of a stop integrally formed with the sleeve of the apparatus 110, metal tube 176 is crimped radially inwardly at regions 192 to form a stop for abutting the bottom end of spring 152.

FIG. 7 also shows a ramp surface 194 extending upwardly from rod 158 and diverging outward toward outer surface 146 of post 140. The ramp surface 194 provides structure for holding and centering spring 152. This feature may assist in reducing wearing on the spring from engagement with metal tube 176.

A further difference in cycle seat support apparatus 110 is best shown in FIG. 8. Protective cover 182 is provided with a slot 184. Key 186 projects outward from post 140 and resides in slot 184. Key 186 is preferably integrally formed with post 140. Engagement of the key 186 with the edges of slot 184 prevents protective cover 182 from rotating relative to post 140. With the structure provided to apparatus 110 as shown in FIG. 8, no glue or other adhesive is needed for mounting protective cover 182 to post 140. When the cycle seat is clamped onto protective cover 182, the protective cover will tighten around post 140. For this reason, slot 184 is initially preferably slightly larger than the width of key 186.

In the present invention, particular advantages arise from providing two elongated plastic surfaces in sliding engagement. Advantages have been realized with the use of plastics generally and particular plastics such as Delrin, Teflon, Valox ® 325 polyester resin and other polyester resins, and Nylatron ® GS 50-60 nylon resin and other nylon based resins. These particular plastics are just some plastics that are anticipated for use. The Nylatron ® GS 50-60 nylon resin is preferred. Applicants further note particular advantages from providing a sleeve 20,120 at least about 4 inches long and at least about 0.375 inches in diameter measured across the opening into the sleeve. Preferably, the sleeve is at least about 5 inches long and about 0.5 inch in diameter across the opening. More preferably, the sleeve is at least about 5.5 inches long with a hexagonal shaped diameter opening with a minimum diameter of about 0.5 inch. Preferably, tube 76,176 is at least about 0.75 inches outside diameter, more preferably at least about 0.80 inches.

It is to be understood that even though numerous characteristics and advantages of the invention have been set forth in the forgoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

What is claimed is:

1. A cycle seat support apparatus for dampening impact loading between a cycle frame and a cycle seat, the cycle frame including a hollow tubular member, the cycle seat support apparatus comprising:

a plastic elongated sleeve defining a longitudinal axis of the sleeve and having a first end, a second end, and an elongated inner surface extending in a direction of the longitudinal axis from the first end toward the second end, the plastic exhibiting sufficient lubricity to permit sliding engagement of the inner surface with another compatible plastic surface thereby minimizing wear of the inner surface;

a metal tube having a top end for receiving the sleeve in an interior of the tube, the tube including means for mounting the sleeve to the tube to limit relative movement between the tube and the sleeve, the tube being receivable by the hollow tubular member of the cycle frame to mount the sleeve to the cycle frame;

a plastic elongated post defining a longitudinal axis of the post and having a first end, a second end, and an elongated outer surface extending in a direction of the longitudinal axis of the post from the first end toward the second end, the plastic of the post compatible with the plastic of the sleeve during sliding engagement, the first end of the post positioned in the first end of the sleeve thereby providing sliding engagement between the outer surface of the post and the inner surface of the sleeve and providing securable engagement of the post and the sleeve, the post further defining an inner passage in the post extending in the direction of the longitudinal axis of the post, the second end of the post being attachable to the cycle seat;

a metal rod with at least a portion positioned in the inner passage of the post, the rod including means for interconnecting the post to the sleeve to limit movement of the post away from the sleeve to a predetermined amount;

means for limiting rotational movement of the post with respect to the sleeve about each respective longitudinal axis; and means for biasing the post to urge the post toward an at rest position when the post is moved longitudinally relative to the sleeve.

2. The cycle seat support apparatus of claim 1, wherein the cross-sectional shape of the outer surface of the post and the opening defined by the inner surface of the sleeve each include at least one substantially flat surface portion, each flat surface portion of the post being adjacent one flat surface portion of the sleeve.

3. The cycle seat support apparatus of claim 2, wherein the cross-sectional shape of the outer surface of the post and the opening defined by the inner surface of the sleeve are substantially hexagonal.

4. The cycle seat support apparatus of claim 1, wherein the metal tube includes a metal stop, and the means for biasing includes a helical spring positioned between the first end of post and the stop.

5. The cycle seat support apparatus of claim 1, further comprising a collar-like shim positioned between an outside surface of the metal tube and an inside surface of the hollow tubular member of the cycle frame, the shim having an outer surface for engaging the inside surface of the hollow tubular member of the cycle frame.

6. The cycle seat support apparatus of claim 1, wherein the sleeve includes an outer elongated surface and a radially outwardly extending flange adjacent the first end of the sleeve, the flange providing the sleeve with an outer diameter greater than an outer diameter of the outer elongated surface; and wherein the metal tube has an inner diameter less than the outer diameter of the flange of the sleeve wherein the flange engages the top end of the metal tube.

7. The cycle seat support apparatus of claim 6, wherein the sleeve and the post are molded thermoplastic components.

* * * * *